US008575893B2

(12) United States Patent
Devaney et al.

(10) Patent No.: US 8,575,893 B2
(45) Date of Patent: Nov. 5, 2013

(54) PORTABLE LIGHTING DEVICE

(75) Inventors: John Devaney, Mountain Top, PA (US); Mark Dirsa, Shavertown, PA (US)

(73) Assignee: Koehler-Bright-Star, Inc., Hanover Township, PA (US)

( * ) Notice: Subject to any disclaimer, the term of this patent is extended or adjusted under 35 U.S.C. 154(b) by 0 days.

(21) Appl. No.: 13/169,939

(22) Filed: Jun. 27, 2011

(65) Prior Publication Data

US 2011/0255275 A1 Oct. 20, 2011

Related U.S. Application Data

(62) Division of application No. 11/832,384, filed on Aug. 1, 2007, now Pat. No. 7,967,467.

(60) Provisional application No. 60/821,034, filed on Aug. 1, 2006.

(51) Int. Cl.
*H02J 7/00* (2006.01)

(52) U.S. Cl.
USPC ............................ 320/114; 320/111; 320/112

(58) Field of Classification Search
USPC .......................................... 320/107, 112, 114
See application file for complete search history.

(56) References Cited

U.S. PATENT DOCUMENTS

| | | | | |
|---|---|---|---|---|
| 4,586,117 | A | 4/1986 | Collins | |
| 4,777,572 | A | 10/1988 | Ambasz | |
| 5,008,785 | A * | 4/1991 | Maglica et al. | 362/183 |
| 5,142,458 | A | 8/1992 | Brunson | |
| 5,239,451 | A | 8/1993 | Menke et al. | |
| 5,455,751 | A | 10/1995 | Lynch et al. | |
| 6,313,604 | B1 * | 11/2001 | Chen | 320/114 |
| D481,813 | S | 11/2003 | Krieger et al. | |
| 6,702,452 | B2 | 3/2004 | Jigamian et al. | |
| 6,802,623 | B1 | 10/2004 | Hsu et al. | |
| 7,059,744 | B2 * | 6/2006 | Sharrah | 362/208 |
| 7,063,438 | B2 | 6/2006 | Sze-Tai | |
| 7,188,978 | B2 | 3/2007 | Sharrah et al. | |
| 2005/0073837 | A1 | 4/2005 | Jian | |
| 2005/0099787 | A1 | 5/2005 | Hayes | |
| 2006/0139001 | A1 * | 6/2006 | Lin | 320/115 |

* cited by examiner

*Primary Examiner* — Samuel Berhanu
(74) *Attorney, Agent, or Firm* — R. Blake Johnston, Esq.; DLA Piper LLP US

(57) ABSTRACT

A portable lighting device that is lightweight and features a space-efficient design includes a body containing a Lithium-ion (Li-ion) battery. The body includes a pair of pivot arms that are spaced from one another. A lamp assembly includes a lamp assembly housing containing a light source that is powered by the Li-ion battery. The lamp assembly housing is pivotally connected to each of the pair of pivot arms and positioned there between. A handle includes a gripping portion that is spaced from the body so that a gripping space is defined between the gripping portion of the handle and the body. A removable bumper pad is positioned on the bottom of the body. The portable lighting device features recesses on opposite sides that are engaged by corresponding tabs on a charging rack. This prevents non-compatible lighting devices from being positioned on the charging rack.

5 Claims, 8 Drawing Sheets

PORTABLE LIGHTING DEVICE

CLAIM OF PRIORITY

This application is a divisional of U.S. application Ser. No. 11/832,384, filed Aug. 1, 2007, now U.S. Pat. No. 7,967,467 , that claims priority from U.S. Provisional Patent Application Ser. No. 60/821,034, filed Aug. 1, 2006.

FIELD OF THE INVENTION

The invention relates generally to portable lighting devices, such as flashlights and lanterns.

BACKGROUND OF THE INVENTION

Portable lighting devices, such as flashlights and lanterns, have long been known and find use in a wide variety of applications. A conventional flashlight includes a body or casing containing a battery and a power switch a lamp assembly including a bulb, reflector, lens and bezel mounted on the upper end of the casing and an end cap mounted or formed on the lower end of the easing. A lantern is essentially a large flashlight that employs a reflector of approximately three or more inches in diameter and a body or case that is larger than a standard flashlight case. The larger case of the lantern accommodates a larger battery and, in some instances, electronics for additional features.

Rechargeable versions of both flashlights and lanterns have been developed. Such flashlights and lanterns typically feature batteries that are recharged when a charger is connected to the flashlight or lantern. Alternatively, the flashlight or lantern may be placed in a charging rack or bracket. While a variety of battery types have been used in rechargeable flashlights and lanterns, Lithium-ion (Li-ion) batteries are preferable for many applications where weight is a concern because they have a higher energy-to-weight ratio then any other commercially available rechargeable battery. Care has to be taken, however, that only compatible chargers are used to recharge Li-ion batteries. It is therefore desirable to provide a charging, rack that only accepts a compatible rechargeable flashlight or lantern. In addition, it is desirable to provide a Li-ion battery flashlight or lantern that features a lightweight design and construction to aid in further reducing the weight of the device.

In order to provide increased flexibility, both flashlights and lanterns that feature pivoting lamp assemblies have been developed. Examples of such flashlights and lanterns include the flashlight of U.S. Pat. No. 5,605,394 to Chen and the Big D Rechargeable 3850 lantern offered by Pelican Products, Inc. of Torrance, Calif. Such flashlights and lanterns include pivot joints where the pivoting lamp assemblies join the easing that contains the batteries and power switch. These pivot joints may break or suffer wear which may make the flashlights or lanterns unusable. It is therefore desirable to provide a flashlight or lantern where the pivot joints may be replaced so that the service life of the device may be extended.

Flashlights and lanterns are often used by firefighters and other emergency personnel. Flashlights and lanterns used by emergency personnel must be able to withstand the severe conditions and abuses that arise when responding to emergency situations. As a result, it is very important that such flashlights and lanterns are provided with a durable construction. Examples of lanterns developed for use by emergency personnel and in other harsh environments are presented in U.S. Pat. No. 6,629,767 to Osiecki et al. and U.S. Pat. No. 7,059,744 to Sharrah. A disadvantage of these lanterns, however, is that they do not feature pivoting lamp assemblies.

In addition, often times firefighters and other emergency personnel are trained to use a lantern as a support when crawling through a passageway having a restricted height. Firefighters also often slide lanterns through passageways or across other surfaces during use. As a result, the bases of the lanterns are subjected to significant abuse and wear. It is therefore desirable to provide a lantern that features a replaceable base so as to extend the service life of the device. The lanterns of the Osiecki et al. '767 patent and the Sharrah '744 patent, and other lanterns and flashlights in the prior art, do not offer such a replaceable base.

DETAILED DESCRIPTION OF EMBODIMENTS

Figure 1:
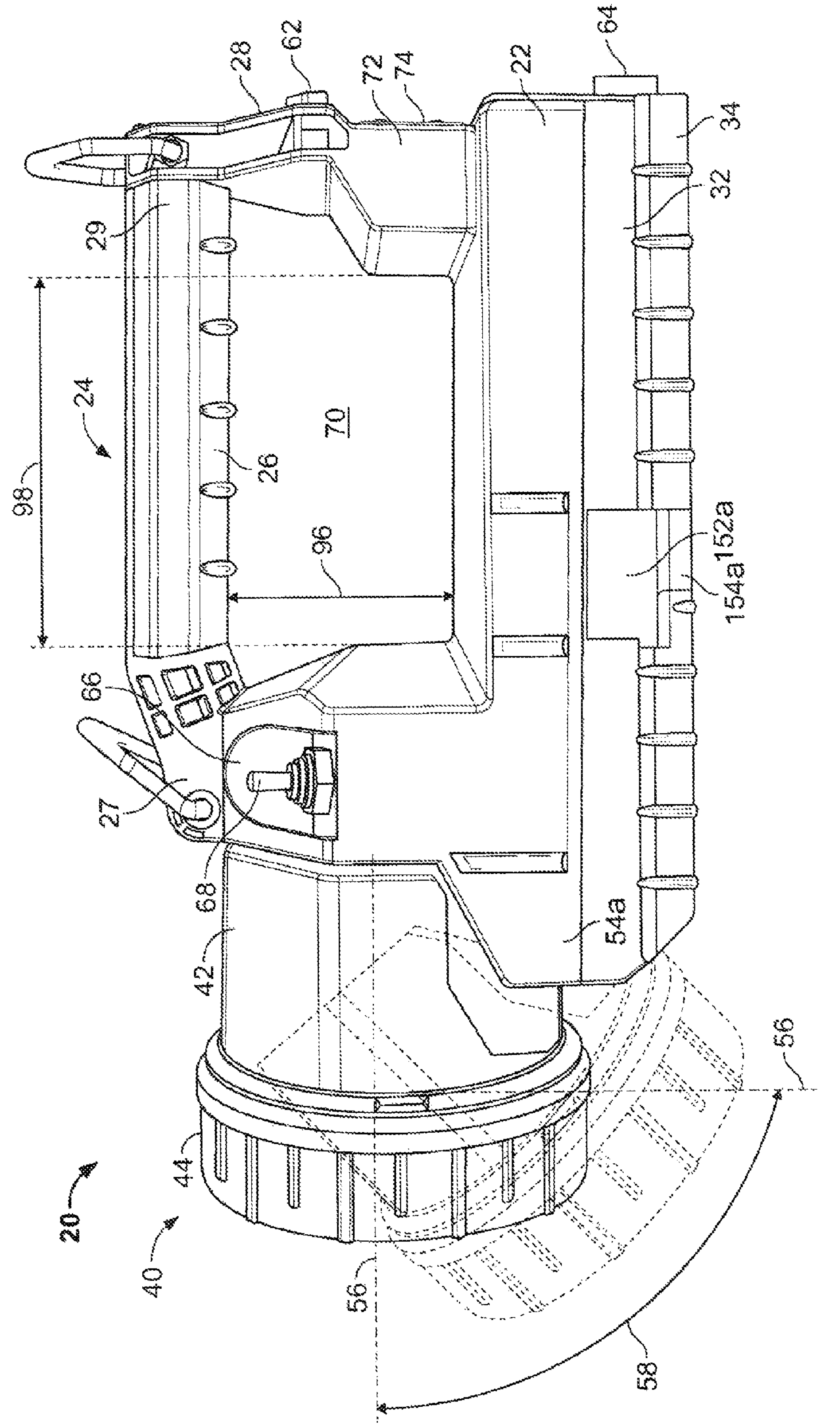
FIG. 1 is a perspective view of a lantern constructed in accordance with the present invention.
Figure 2:
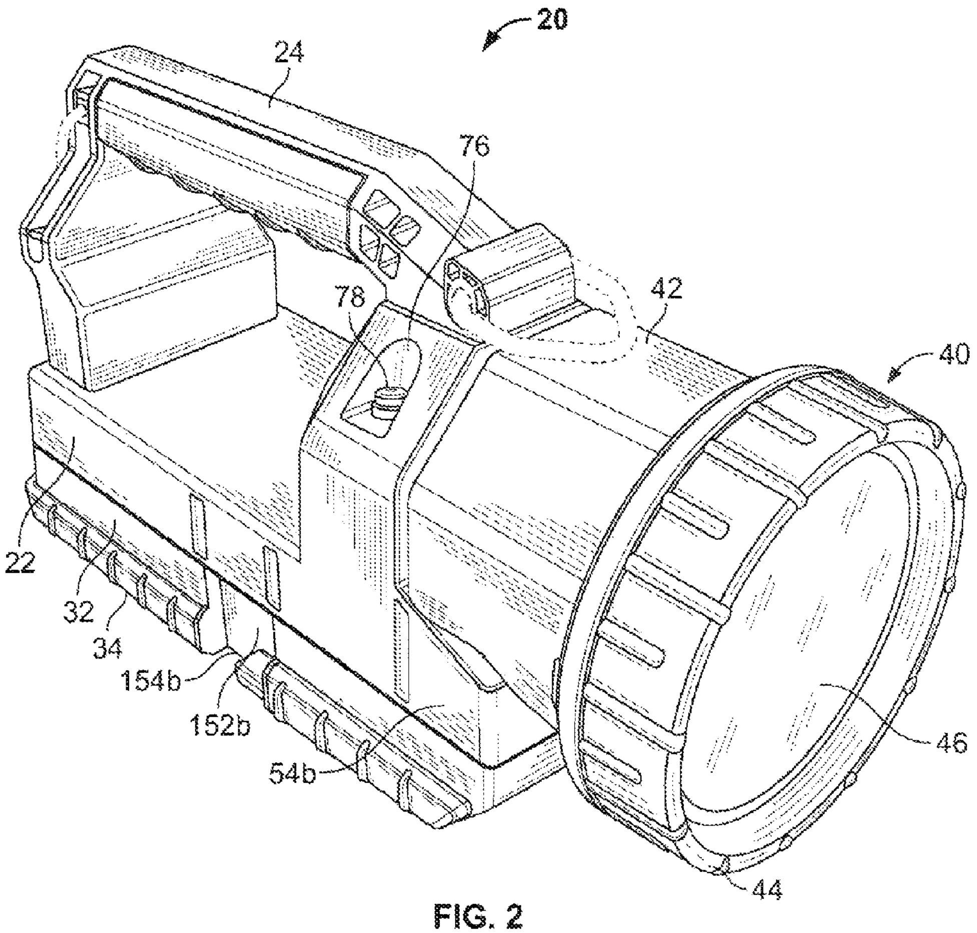
FIG. 2 is an alternative perspective view of the lantern of FIG. 1.
Figure 3:
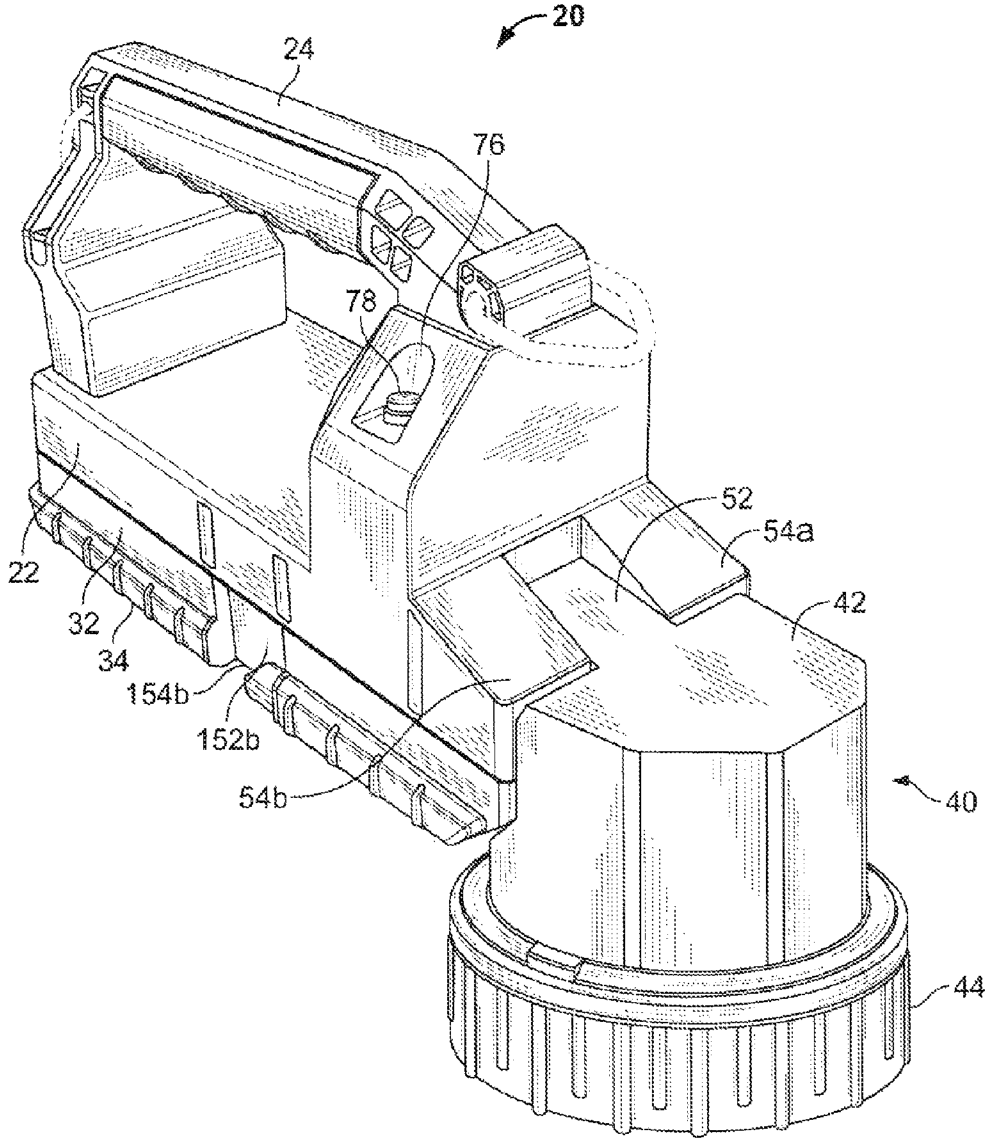
FIG. 3 is a perspective view of the lantern of FIGS. 1 and 2 with the light assembly in a fully tilted position.

A lantern constructed in accordance with the present invention is indicated in general at 20 in FIGS. 1-3. While the invention is described below in terms of a battery-powered lantern, it is to be understood that the invention may alternatively be incorporated into a flashlight or other portable lighting device that is battery-powered or that uses an alternative source of power.

The lantern includes a main body, indicated at 22, which preferably is constructed of plastic. Alternative materials that are strong but lightweight ma be used instead of plastic. With reference to FIG. 1, a handle, indicated in general at 24, features a gapping portion 26 with a leading end 27 that is attached to the body. The trailing end 29 of the gripping portion is connected to a connecting portion 28, which is also connected to body 22. While the handle and body are preferably molded as a single piece, the handle may alternatively formed as a separate piece, and from a different material, and joined to the body.

As will be explained in greater detail below, a cover 32 attaches to the bottom of the body to enclose the interior chamber defined by the body and secure the wiring and electrical components therein. A shock-absorbing bumper pad 34 is positioned on the bottom of the cover 32 to protect the device from damage due to dropping. The bumper pad also provides a non-slip surface allowing the lantern to be used as a support and source of traction when the user is crawling (for example, a firefighter crawling through a passageway). The non-slip feature of the bumper pad also allows the lantern to be positioned on angled smooth surfaces for hands-free operation. While the bumper pad 34 is preferably constructed from rubber, other durable, non slip materials may be used instead.

A lamp assembly, indicated in general at 40 in FIGS. 1-3, is mounted to the front of the body 22. The lamp assembly includes a lamp assembly housing 42, which houses a light source such as a reflector, socket and bulb. The bulb may be any type of light-producing bulb including, but not limited to, an incandescent light bulb, a halogen lamp or a light emitting diode (LED) lamp. The housing 42 is preferably constructed of plastic. The lamp assembly also includes a bezel 44 which surrounds a lens 46 (FIG. 2). The bezel 44 features threads which engage the corresponding threads on the lamp assembly housing. The bezel is preferably constructed of rubber, or features a rubber coating, to protect the lamp assembly if the lantern is dropped or the lamp assembly is otherwise bumped against a surface.

Figure 4:
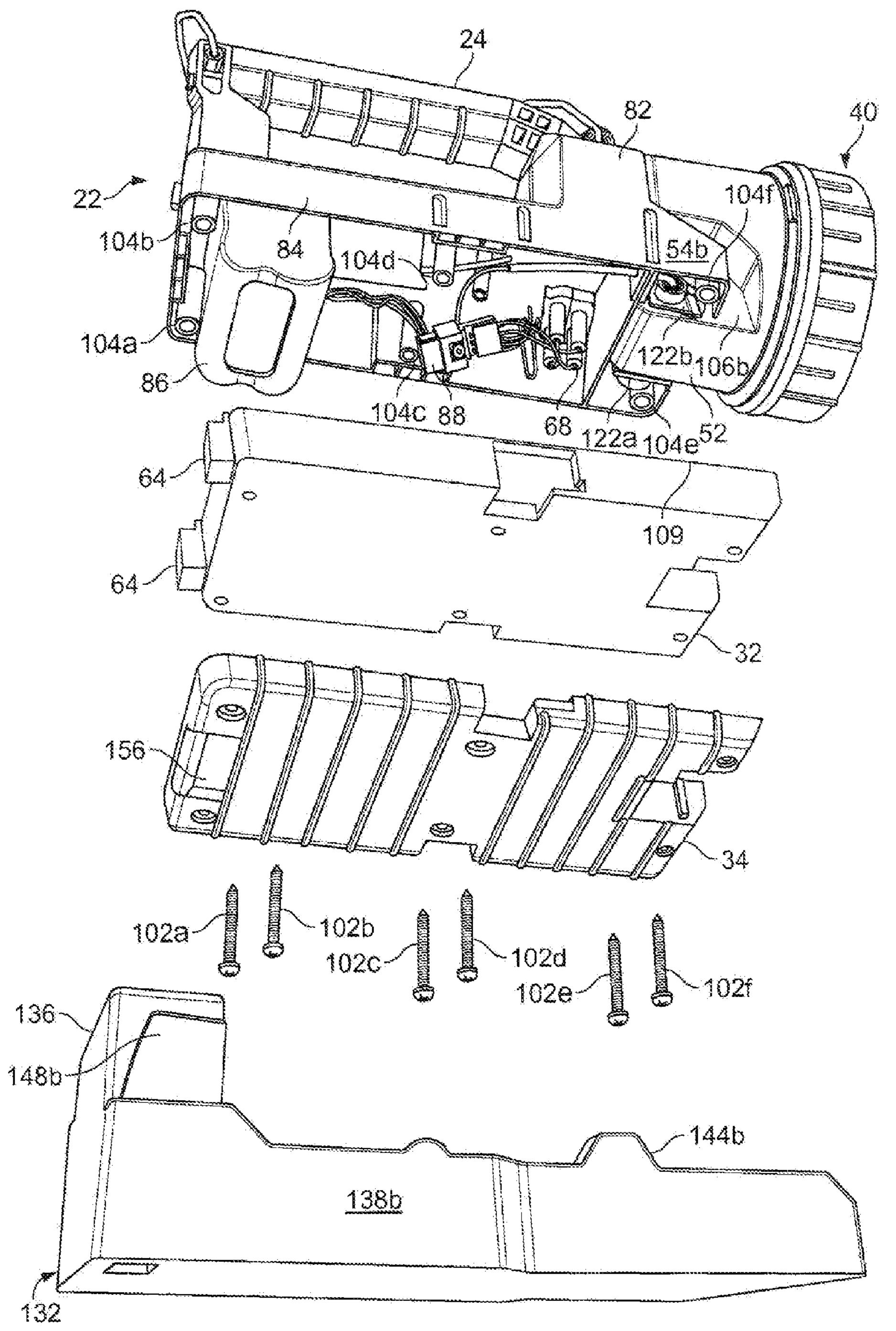
FIG. 4 is an exploded perspective view of the lantern of FIGS. 1-3 and a compatible charging rack.
Figure 5:
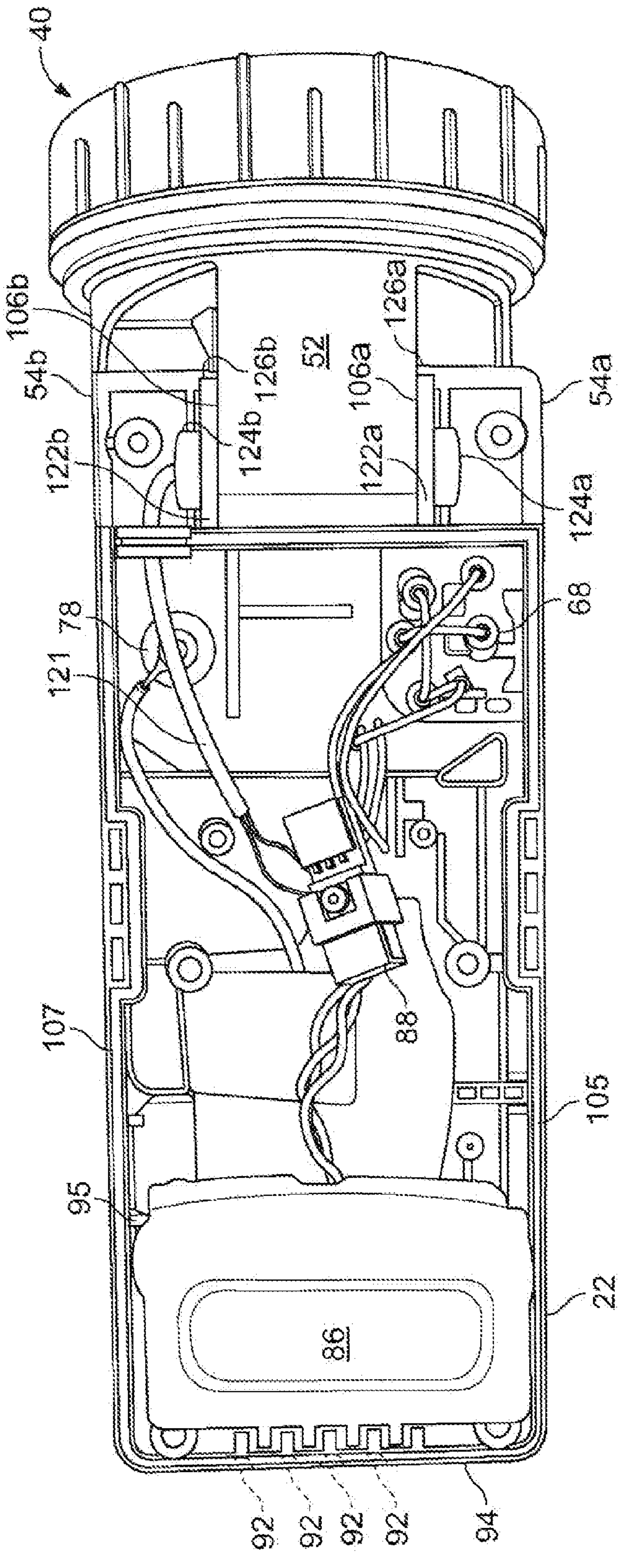
FIG. 5 is a bottom plan view of the lantern of FIG. 4.

As illustrated in FIGS. 3-5, the lamp assembly housing includes a narrowed hinge portion 52. The body 22 of the lantern also features a pair of spaced pivot arms, indicated at 54*a* and 54*b* in FIG. 3. As illustrated in FIG. 3 (and FIGS. 4 and 5), the hinge portion 52 of the lamp assembly fits within the space between the arms 54*a* and 54*b* where, as will be explained in greater detail below, it is supported in a pivoting fashion. This permits the lamp assembly 40 to be pivoted, with respect to body 22, between a "carrying" position, illustrated in FIGS. 1 and 2, and a "fully tilted" position, illustrated in FIG. 3. More specifically, when the lamp assembly is pivoted between the carrying and fully tilted positions, as illustrated in phantom in FIG. 1, the longitudinal axis of the lamp assembly and the beam of light produced by the lamp assembly), illustrated at 56 in FIG. 1, travels through the pivot angle indicated at 58. This angle is greater that 90°.

When the lamp assembly 40 is in the fully tilted position illustrated in FIG. 3, or in other tilted positions, the lantern can be stood on the end opposite of the lamp assembly so that the lantern sits in an upright position on a surface. As indicated at 62 and 64 in FIG. 1 (and FIG. 4), the handle connecting portion 28 and cover 32 are provided with support protrusions that support and protect the lantern when so positioned. In addition, when the lamp assembly is tilted, the lantern may rest on the bumper pad 34 near the edge of an opening, such as manhole, so that the light to shines down into the opening. By providing a pivot angle that is greater than 90 degrees, the lantern provides greater flexibility for directing the beam of light that is produced by the lamp assembly.

In addition, with reference being made to FIG. 3, the positioning of the hinge portion 52 of the lamp assembly between the pivot arms 54*a* and 54*b* of the body provides a secure and durable pivot mounting for the lamp assembly. The mounting arrangement also provides a compact profile for the lantern when the lamp assembly is in the carrying position illustrated in FIGS. 1 and 2 while still providing the pivot range described above.

As illustrated in FIG. 1, the body 22 of the lantern is provided with a recess 66 within which the power switch 68 for the lantern is positioned. The recess 66 protects the power switch 68 from damage and accidental engagement. In addition, positioning the power switch outside of the gripping space 70 defined between the handle 24 and the body 22 also prevents accidental engagement of the power switch. The location of the recess and power switch near the leading end of the gripping portion 26 of the handle, however, facilitates access to the power switch for the thumb of a user for one-handed operation of the lantern.

Figure 9:
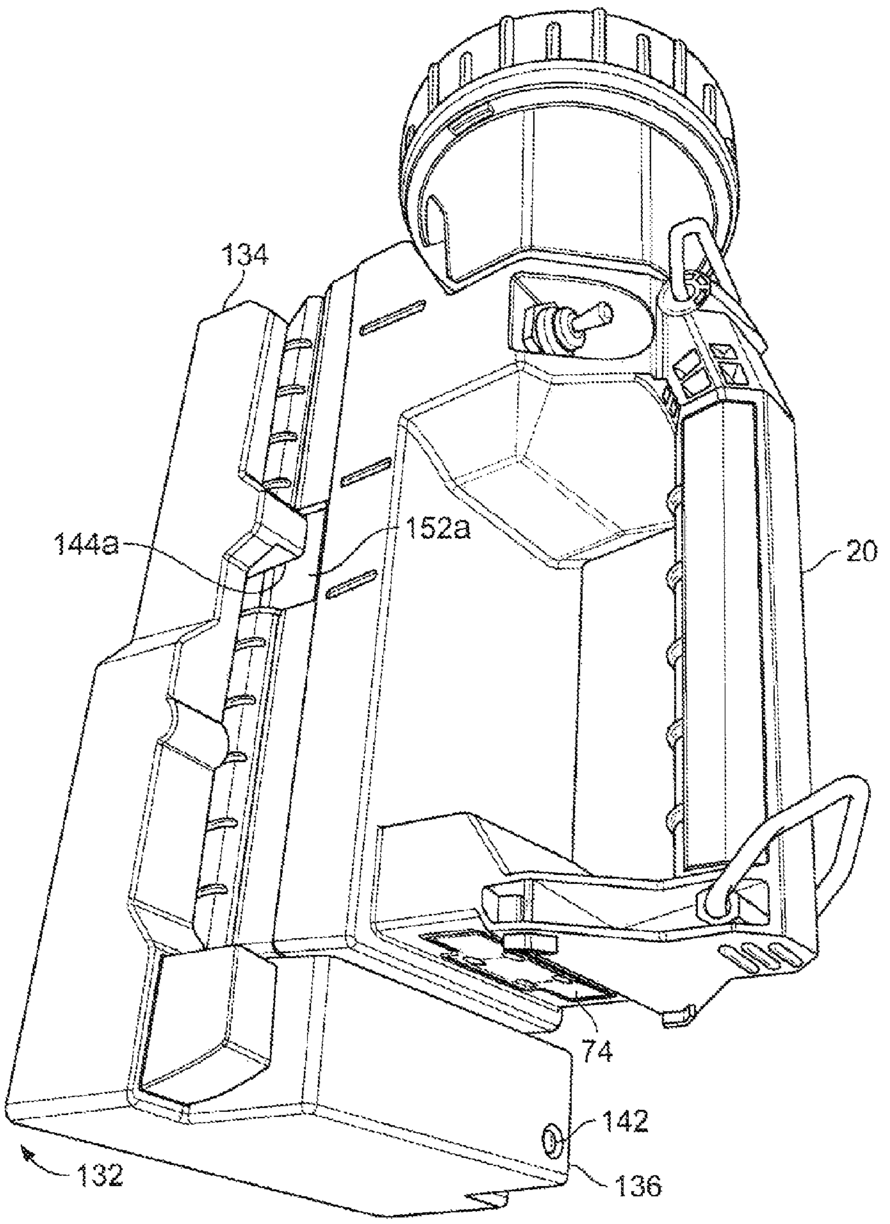
FIG. 9 is a perspective view of the lantern of FIGS. 1-3 positioned in the charging rack of FIGS. 4 and 8 during charging.

The connecting portion 28 of the handle may include an accessory module housing 72 that may include a tail light 74 (see also FIG. 9). The switch 68 of the lantern may therefore feature three positions: a first position where the lantern is off, a second position where the lamp assembly is energized and a third position where the both the lamp assembly and the tail light 74 are energized.

As illustrated in FIGS. 2 and 3, the body 22 of the lantern is also provided with a recess 76 within which a low-battery indicator light 78 is positioned. The low-battery indicator light, which is preferably an LED for ease of visibility, illuminates when a predetermined period of battery usage time (for example, 30 minutes) remains. The positioning of the low-battery indicator light near the leading end of the gripping portion of the handle facilitates viewing by the user while the recess 76 protects the light from damage.

The lantern of FIGS. 1-3 features a space-efficient design and thus, especially when combined with a Li-ion battery pack and a plastic body material, provides a compact, lightweight and durable device while still providing superb functionality. As illustrated in FIG. 4, the body of the flashlight 22 features an upper portion 82, that defines an upper compartment, and a lower portion 84, that defines a lower compartment. As illustrated in FIGS. 4 and 5, the lower compartment houses a Li-ion battery pack 86, a connector 88 and associated wiring which connects the battery to the lamp assembly 40, power switch 68, the low battery indicator light 78, the tail light (74 in FIGS. 1 and 9) and the battery recharge contacts, which are illustrated in phantom at 92 in FIG. 5 and positioned on the back wall 94 of the lantern body 22.

The power switch 68 and low-battery indicator light 78 are housed in the upper compartment of the body. As explained above, such positioning improves access and visibility of the power switch and low battery indicator light.

The positioning of the battery pack 86 near the back wall 94 of the body and in the lower compartment provides the lantern with a low center of gravity both when it is resting on the bumper pad 34 (FIGS. 1-4) or on the protrusions 62 and 64 (FIGS. 1 and 4) in the upright position. In addition, the rearward placement of the battery pack assists in offsetting the weight of the lamp assembly when the lantern is carried by the handle. This provides the lantern with a more balanced feel when it is carried and facilitates aiming. The battery pack is preferably secured in place at least in part by ridges, illustrated at 95 in FIG. 5, molded into interior surfaces of the body 22.

As mentioned previously, a gripping space 70 (FIG. 1) is defined between the handle 24 and the body 22. This space is preferably sized large enough to accommodate the fingers of a firefighter's gloved hand while providing a weight-saving void. The gripping space must not be too large, however, or the lantern will become unwieldy. A gripping space height (illustrated by arrow 96 of FIG. 1) of approximately 2.0 to 2.5 inches combined with a gripping space width (illustrated by arrow 98 of FIG. 1) of approximately 3.5 to 4.5 inches is preferable.

As illustrated in FIG. 4, the cover 32 and bumper pad 34 of the lantern are secured to the body 22 of the lantern by screws 102*a-d* that engage threaded bosses 104*a-d* after passing through corresponding bores formed through the cover and bumper pad. In addition to permitting access to the interior of the body, such a construction permits the bumper pad 34 to be replaced in the event of damage or wear. Other removable attachment arrangements known in the art may be substituted for screws 102*a*-102*d*.

A gasket, illustrated at 105 in FIG. 5 and preferably formed from robber, is positioned within a recess 107 that is formed along the periphery of the bottom of the body 22 of the lantern. The gasket forms a seal between the lantern body and the periphery of the cover (109 in FIG. 4) when the cover is mounted to the body, as illustrated in FIGS. 1-3, so that water, dirt and smoke do not enter the body and cause damage to the electrical components therein.

Figure 6:
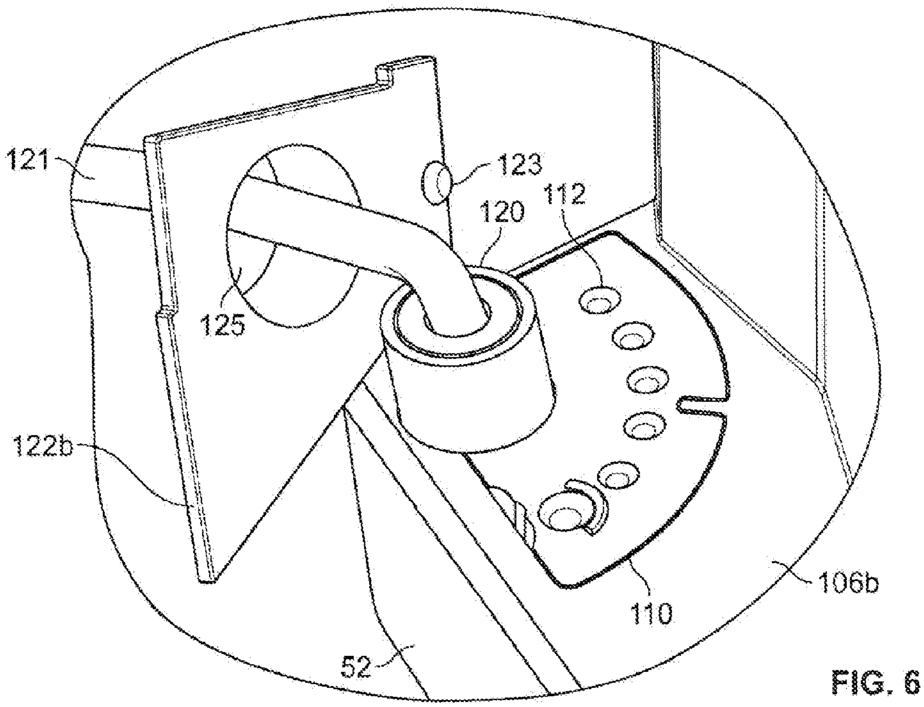
FIG. 6 is an enlarged perspective view of the replaceable pivot and ratchet plates of the lantern of FIGS. 1-5 in a disassembled configuration.

The lantern provides a ratcheting feature to facilitate selection of various tilt angles for the lamp assembly with respect to the lantern body. With reference to FIGS. 4-6, the hinge portion 52 of the lamp assembly 40 features opposing sides 106*a* and 106*b*. As illustrated in FIG. 6, side 106*b* of the hinge portion is provided with a ratchet plate 110, which sits within a recess formed within side 106*b*. As a result, the ratchet plate 110 moves with the hinge portion 52 when the lamp assembly is pivoted. The ratchet plate 110 features a number of divots 112.

As illustrated in FIG. 6, a knob 120 is molded onto side 106*b* of the hinge portion of the lamp assembly. A wire 121 (FIGS. 5-7) provides power from the battery pack to the lamp assembly and passes through an aperture formed through the center of the knob into the lamp assembly housing to the socket and bulb therein. Hinge portion 52 side 106*a* (FIG. 5) features a similar ratchet plate and mounting arrangement.

Figure 7:
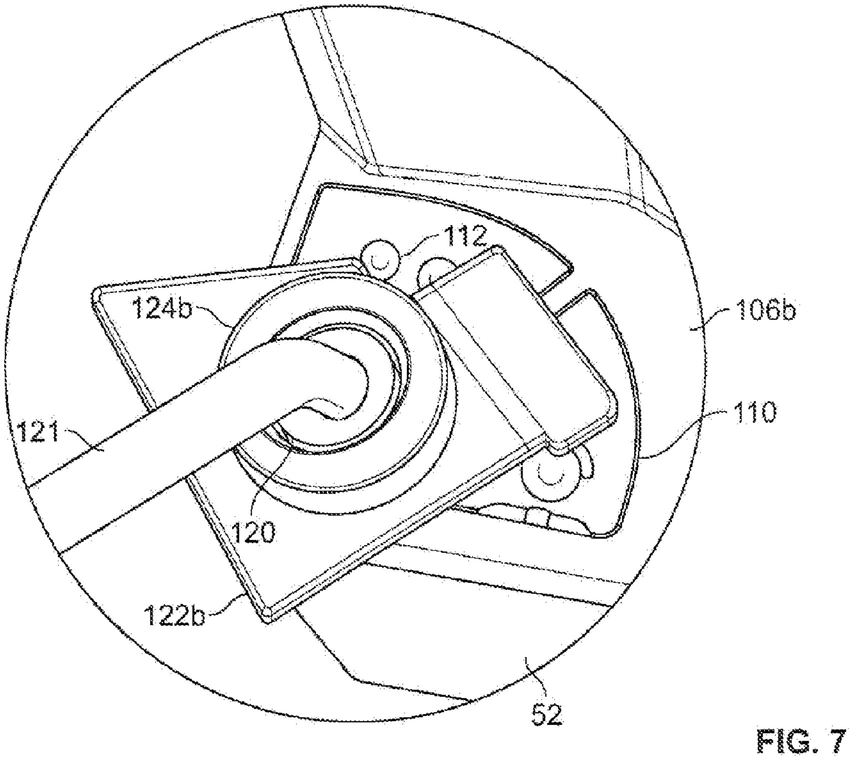
FIG. 7 is a perspective view of the replaceable pivot and ratchet plates of FIG. 6 in an assembled configuration.

As illustrated in FIG. 6, a pivot plate 122*b* features a protruding button 123 that is sized to engage the divots 112 of ratchet plate 110 when the pivot and ratchet plates are assembled as illustrated in FIG. 7. In addition, as illustrated in FIG. 7, pivot plate 122*b* features a boss 124*b* with a central opening (125 in FIG. 6) that is sized to receive knob 120. As a result, pivot plate 122*b* may pivot with respect to knob 120 and ratchet plate 110. Button 123 (FIG. 6 of the pivot plate 122*b* engages individual divots of the ratchet plate as the pivot plate is rotated about knob 120. As illustrated in FIG. 5, a pivot plate 122*a* is similarly mounted on the side 106*a* and features boss 124*a*.

As illustrated in FIG. 5, the body 22 of the lantern features notches 126*a* and 126*b* that receive pivot plates 122*a* and 122*b*, respectively. As a result, the pivot plates remain fixed with regard to the lantern body as the lamp assembly is pivoted. The engagement of the button (23 in FIG. 6) of each pivot plate with the divots (112 in FIG. 6) of each ratchet plate prevent the lamp assembly from rotating freely with respect to the lamp body, thus facilitating the adjustment of the lamp assembly in a number of useful angles for hands-free use of the lantern.

In the event of wear of either the pivot plates or the ratchet plates, the cover 32 (FIG. 5) of the lantern may be removed from the body 22 and the pivot plates 122*a* and 122*b* and lamp assembly 40 may be slid out of the open bottom of the body. The ratchet plates (110 in FIGS. 6 and 7) may then be lifted out of their recesses for replacement and the pivot plates (122*a* and 122*b* in FIGS. 4-7) may be lifted off of their respective knobs (120 in FIG. 6) for replacement.

Figure 8:
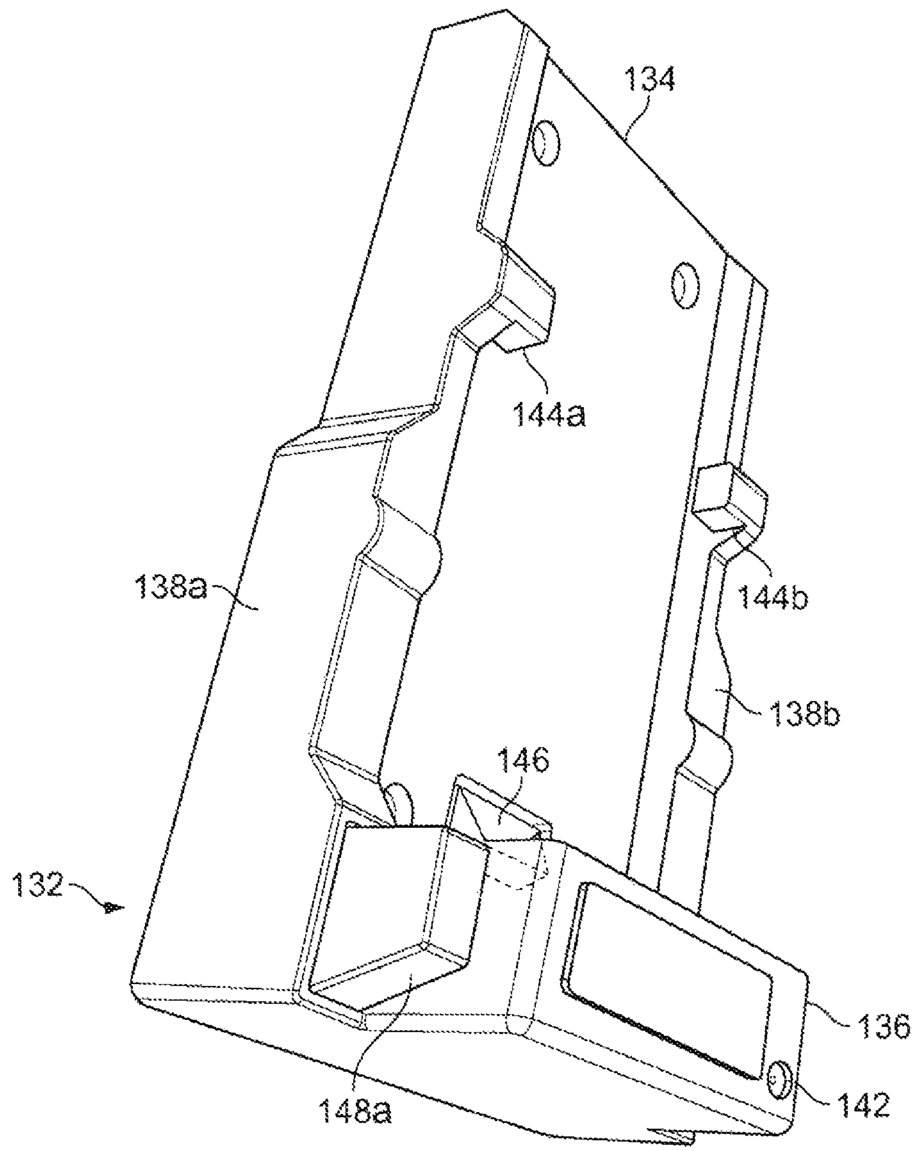
FIG. 8 is a perspective view of the charging rack of FIG. 4 for charging the lantern of FIGS. 1-3.

A charging rack suitable for recharging the lantern of FIGS. 1-3 is indicated in general at 132 in FIGS. 4, 8 and 9. The charging rack includes a base 134 and charging module 136 positioned at a lower end of the base. The base features a pair of opposing guide walls 138*a* and 138*b* between which the lantern is received during charging, as illustrated in FIG. 9. When the lantern is inserted in the charging rack and placed in the position shown in FIG. 9, the charging contacts (92 of FIG. 5) come into contact with corresponding charging pins that protrude upwards from charging module 136. A plug and socket arrangement, or other electrical connector arrangements know in the art for charging devices, may be substituted for the charging contacts and pins. A power cord (not shown) provides power to the charging module 136 and a charging indicator light 142 illuminates when a lantern is being charged.

As illustrated in FIGS. 8 and 9, each guide wall 138*a* and 138*b* of the charging rack 132 is provided with inwardly-protruding tabs 144*a* and 144*b*. In addition, as illustrated in FIG. 8, the charging rack is provided with a retractable locking member 146 that retracts when either push button 148*a* (FIGS. 8 and 9) or 148*b* (FIG. 4) is pressed.

As illustrated in FIGS. 1-4, the cover 32 of the lantern is provided with inverted L-shaped recesses 152*a* and 152*b* on opposing sides. These L-shaped recesses are engaged by the tabs 144*a* and 144*b* (FIG. 8) of the charging rack when the lantern is positioned therein for charging, as illustrated in FIG. 9. More specifically, to insert the lantern into the charging rack, the openings of the L-shaped recesses, illustrated at 154*a* and 154*b* in FIGS. 1-3, of the lantern are vertically aligned with the tabs 144*a* and 144*b* of the charging rack. The lantern bottom is then moved horizontally towards the base 134 of the charging rack so that tab 144*a* of the charging rack enters L-shaped recess 152*a* of the lantern and tab 144*b* of the charging rack enters L-shaped recess 152*b* of the lantern. The lantern is then moved downwards into the position illustrated in FIG. 9 so that the charging contacts of the lantern (92 in FIG. 5) come into contact with the corresponding pins of the charging module 136. The tabs 144*a* and 144*b* of the charger prevent non-compatible flashlights from accidentally being inserted into the charging rack. Only flashlights featuring L-shaped recesses like the lantern of FIGS. 1-3 and 9 may be inserted into the charging rack.

As illustrated in FIG. 4, the bumper pad 34 and cover 32 of the lantern feature a locking recess 156. As the lantern is lowered into the position shown in FIG. 9, the retractable locking member 146 (FIG. 8) of the charging rack is forced inwards by the bumper pad of the lantern and then springs outward into the position shown in FIG. 8 so that it is positioned within the locking recess 156 of the bumper pad. As a result, the lantern may not be lifted out of the charging rack until either push button 148*a* (FIGS. 8 and 9) or 148*b* (FIG. 4) is pressed and locking member 146 is retracted. The combination of the locking member 146 of the charging rack engaging the locking recess 156 of the lantern, and the tabs 144*a* and 144*b* of the charging rack engaging the L-shaped recesses 152*a* and 152*b* of the lantern, prevents the lantern from falling off or out of the charging rack during charging. The lantern is locked in the position illustrated in FIG. 9 until either push button 148*a* or 148*b* is pushed and the lantern is lifted up and pulled away horn the base 134 of the charging rack so that the tabs of the charging rack exit the L-shaped recesses of the lantern.

While the charging rack illustrated in a vertical orientation in FIGS. 8 and 9, it may instead be mounted horizontally, as illustrated in FIG. 4.

While the preferred embodiments of the invention have been shown and described, it will be apparent to those skilled in the art that changes and modifications may be made therein without departing from the spirit of the invention, the scope of which is defined, by the appended claims.

What is claimed is:

1. A charging rack for a rechargeable portable lighting device comprising:

a. a base featuring a first sidewall and a second sidewall, said first and second sidewalls spaced from one another and said base adapted to receive the portable lighting device between the sidewalls;

b. a charging module positioned at a lower end of the base and adapted to electrically engage the portable lighting device to recharge it;

c. a first inwardly-protruding tab positioned on the first sidewall, said first inwardly-protruding tab adapted to engage a corresponding first recess on the portable lighting device so that portable lighting devices not featuring the first recess may not be placed on the charging rack;

d. a retractable locking member positioned between the first and second sidewalls of the base;

e. a first push button attached to the base and said retractable locking member, said retractable locking member retracting when the first push button pushed;

f. said retractable locking member adapted to engage a corresponding recess in a rechargeable portable lighting device to so that the device is locked on the charging rack and said retractable locking member releasing the device when the first push button is pushed; and g. a second push button attached to the base and said retractable locking member, said retractable locking member also retracting when the second push button is pushed.

2. The charging rack of claim 1 wherein the first and second push buttons are positioned on opposite sides of the charging module.

3. The charging rack of claim 1 further comprising a second inwardly-protruding tab positioned on the second sidewall, said second inwardly-protruding tab adapted to engage a corresponding second recess on the portable lighting device so that portable lighting devices not featuring the second recess may not be placed on the charging rack.

4. A rechargeable portable lighting system comprising:

a. a rechargeable portable lighting device including:

i) a body featuring a lower portion;

ii) a handle attached to the body, said handle including a gripping portion that is spaced from the body so that a gripping space is defined between the gripping portion of the handle and the body;

iii) a lamp assembly including a lamp assembly housing containing a light source mounted to the body;

iv) said lower portion of the body provided with a first recess on a first side of the lighting device;

b. a charging rack including:

i) a base featuring a first sidewall and a second sidewall, said first and second sidewalls spaced from one another so that said portable lighting device may be received there between;

ii) a charging module positioned at a lower end of the base and electrically engaging said portable lighting device to recharge it when said portable lighting device is positioned between said first and second sidewalls of the base;

iii) a first inwardly-protruding tab positioned on said first sidewall, said first inwardly-protruding tab engaging the first recess on said portable lighting device when said portable lighting device is positioned between said first and second sidewalls and in engagement with the charging module so that portable lighting devices not featuring the first recess may not be placed on the charging rack;

c. wherein the rechargeable portable lighting device includes a locking recess positioned on a bottom of the body and wherein the charging rack further includes:

a retractable locking member positioned between the first and second sidewalls of the base;

a first push button attached to the base and said retractable locking member, said retractable locking member retracting when the first push button is pushed;

iii) said retractable locking member engaging the locking recess of the rechargeable portable lighting device so that the device is locked on the charging rack when the portable lighting device is positioned between said first and second sidewalls and in engagement with the charging module, and said retractable locking member retracting and releasing the device when the first push button is pushed; and d. wherein the charging rack further includes a second push button attached to the base and said retractable locking member, said retractable locking member also retracting when the second push button is pushed.

5. The rechargeable portable lighting system of claim 4 wherein the first and second push buttons of the charging rack are positioned on opposite sides of the charging module.

* * * * *